Dec. 4, 1962
T. S. REESE
3,067,054
TRANSFER FOR DECORATION OF PLASTIC FILM
Original Filed April 19, 1957
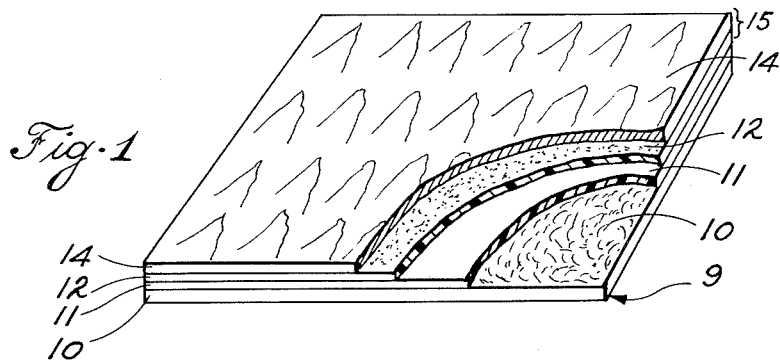
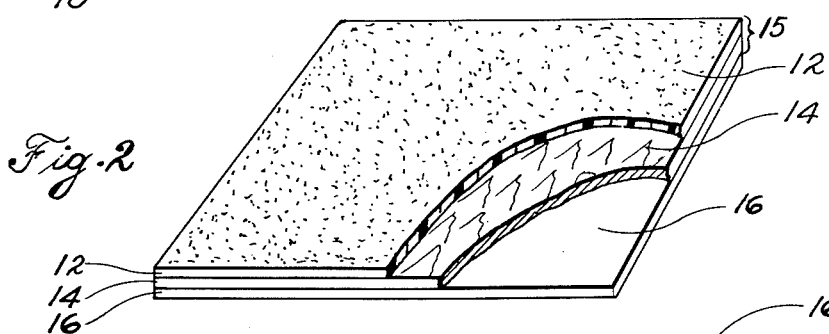
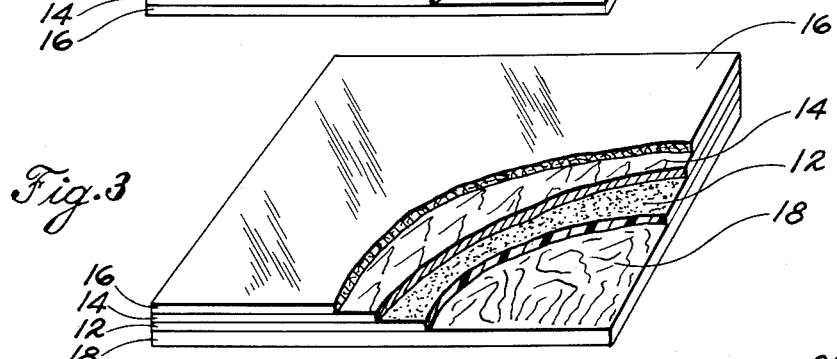
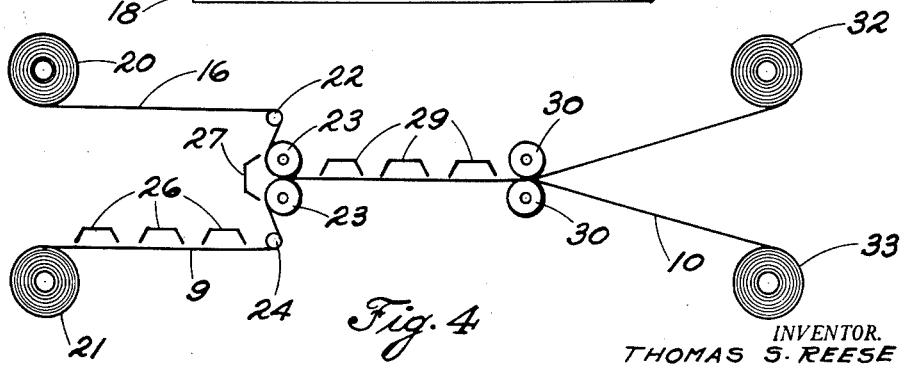
INVENTOR.
THOMAS S. REESE
BY
ATTORNEYS United States Patent Office 3,067,054
Patented Dec. 4, 1962

3,067,054
TRANSFER FOR DECORATION OF PLASTIC FILM
Thomas S. Reese, East Cleveland, Ohio, assignor, by mesne assignments, to Di-Noc Chemical Arts, Inc., Cleveland, Ohio, a corporation of Delaware
Original application Apr. 19, 1957, Ser. No. 654,015, now Patent No. 3,014,828, dated Dec. 26, 1961. Divided and this application Apr. 15, 1959, Ser. No. 806,638
7 Claims. (Cl. 117—3.4)

The present application is a division of prior application Serial No. 654,015, filed April 19, 1957, for "Decoration of Plastic Film Materials" (now Patent 3,014,-828).

This invention relates to a transfer for the decoration of plastic materials and more particularly to a transfer for the decoratioon of plastic film materials on which it is difficult to obtain good results by printing. The invention is especially useful in the decoration of films of the polyester type, particularly unoriented polyester films, which are advantageous because of their physical characteristics, including excellent resistance to wear, abrasion, household stains, solvents and moisture. As herein used, the term "film" is intended to include sheeting.

One of the principal objects of the invention is to provide a high-quality decorative transfer of the dry-stripping type which can be applied to advantage to the film to be decorated while both it and the film are traveling at high speed through apparatus adapted to consolidate them by the application of heat and pressure. To this end, the transfer is provided on one of its two exposed faces with a continuous or substantially continuous decorative or design layer incorporating constituents that have the property of bonding firmly at superatmospheric temperatures and pressures to films of the polyester type, particularly unoriented films. This in turn makes possible the provision of durable, attractively decorated articles in which the polyester film is used as the wear surface.

Other objects and advantages of the invention will become apparent from the following description of preferred forms thereof, reference being made to the accompanying drawings wherein:

FIGURE 1 is a diagrammatic illustration with parts broken away and with the thickness of the various layers much enlarged and not necessarily in proportion, showing a preferred form of transfer used in decorating film materials in accordance with the present invention.

FIGURE 2 is a similar illustration of the decorated film.

FIGURE 3 is a similar illustration of a sheet of base material having the film bonded thereto, and FIGURE 4 is a diagrammatic illustration of apparatus for applying the transfer to the film on a continuous rather than a batch basis.

Considering first the problem in its general aspects, there are various plastic film materials which are particularly desirable in products such as flooring, wall coverings and surface decorations for metal, plywood, chipboard, wall board and the like because of their resistance to wear, abrasion, moisture and solvents but which are extremely difficult to decorate satisfactorily by direct printing and, in their oriented forms, difficult to laminate at elevated temperatures. Examples are the so-called polyester films, particularly those composed of the ethylene terephthalate polymers and the corresponding copolymers.

The usual methods of printing on plastic films, which depend on the use of inks embodying vehicles that are solvents for the film being printed on and frequently the use of the same resin in the ink as the resin making up the film, are not entirely practical with these films because active solvents for the resins are, in general, highly toxic. Not only are the films themselves inherently difficult to print, but they are produced by extrusion processes which introduce into the products minor surface irregularities, waviness, and variations in thickness that make them difficult to handle. If oriented, as by bi-axial stretching, they shrink when laminated at elevated temperatures.

According to the present invention, the printing step is eliminated and the lamination step facilitated by incorporating the design in a transfer such as that indicated in general by reference character 9 in FIGURE 1 and then transferring the design to a substantially unoriented polyester film. As shown in FIGURE 1, transfer 9 comprises a backing sheet 10 having a polyethylene stripping layer 11 thereon, a thermoplastic resin layer 12 that sometimes is pigmented, the same overlying stripping layer 11, and a substantially continuous design layer 14 printed on the thermoplastic resin layer.

In producing this transfer, paper is preferably employed as the backing sheet. Cast coated paper such as that sold by the Champion Paper and Fibre Company of Hamilton, Ohio, under the trademark "Krome-Kote" is satisfactory. The paper has a clay coating, giving it a smooth, yet absorptive surface. In lieu of cast coated paper, other suitable papers of kinds conventionally used in making transfers may be used, if desired.

The polyethylene stripping layer 11 is preferably formed by coating the finished face of paper 10 with a solution of polyethylene in a volatie organic solvent such as xylol or high flash naphtha. Preferably, the polyethylene has a molecular weight in the range between about 12,000 and 21,000. The solution contains about 30% solids, although it may vary from as little as 5% to as much as 50%. The solution is applied by spraying, brushing, spreading, roll coating, reverse roll coating or an equivalent operation. The coating is dried in any convenient manner to form the stripping layer. The dry thickness of the film constituting the stripping layer preferably is of the order of .0005 to .001".

If desired, an extruded polyethylene film having a thickness of about .001" may be calendered onto paper 10 to serve as the stripping layer.

In lieu of polyethylene, it is possible to use vinyl chloride polymers or copolymers, vinylidene chloride polymers or copolymers, any one of various cellulose esters, and other materials that will adhere firmly to the paper and provide a smooth surface on which the transfer film may be laid down and from which the transfer film may readily be separated. The stripping layer must be composed of a material which adheres firmly to the paper, which provides a smooth surface on which thermoplastic resin layer 12 may be formed, and from which the latter can easily be separated at the proper time. It also must be able to withstand the heat of the subsequent operations. These requirements are particularly well satisfied by polyethylene, which is preferred for this reason.

After stripping layer 11 has been applied to paper 10, a pigmented or unpigmented thermoplastic resin layer 12 of different chemical nature is applied to the stripping layer. This may be accomplished by solution casting in any of its forms, but is preferably accomplished by flowing, spreading, roll coating or reverse roll coating. The coating may have a dry thickness between approximately .0005" and .0025". Assuming that the stripping layer is of polyethylene, the coating preferably is composed of a solution of at least one or, if desired, more than one of the resins of the vinyl family; e.g., a vinyl resin, an acrylic resin, a styrene resin, an acrylonitrile resin, or the like: all of these resins contain functional radicals, which is advantageous. It is also possible to use a polymerized ethylene terephthalate or tere-iso-phthalate resin, or, if desired, one of the cellulose esters.

Typical formulations for the thermoplastic resin layer are given below (parts by weight).

*Formulation A*

| Ingredients: | Parts by weight |
| --- | --- |
| Titanium dioxide | 13.00 |
| B-73 acrylic resin [1] | 9.00 |
| A-101 acrylic resin [1] | 3.00 |
| Toluol | 13.50 |
| Xylol | 3.50 |
| Methyl ethyl ketone | 4.50 |

[1] Copolymerized methyl and ethyl esters of acrylic and methacrylic acids supplied by Rohm & Haas Company.

*Formulation B*

| Ingredients: | Parts by weight |
| --- | --- |
| Titanium dioxide | 13.00 |
| VAGH vinyl resin [1] | 12.00 |
| Admex 710 [2] | 2.00 |
| Diacetone alcohol | 20.00 |
| Nitroethane | 10.00 |
| Xylol | 24.00 |

[1] Vinyl chloride-vinyl acetate copolymer supplied by Bakelite Company.
[2] Polymeric-type epoxydized soya bean oil plasticizer of medium oil length supplied by Archer-Daniels-Midland Company.

In making up the above formulations, the ingredients are mixed together in a pebble mill or other suitable dispersion mill.

The thermoplastic resin layer 12 so formed does not bond in permanent fashion to the polyethylene stripping layer 11. It adheres to it sufficiently so that the bond will be maintained notwithstanding machine handling but lightly enough so that when the times comes, paper backing sheet 10 and polyethylene stripping layer 11 can be dry-stripped from thermoplastic resin layer 12 without requiring the application of water or solvent to the paper. The stripping step can be accomplished without difficulty at ordinary temperatures. The polyethylene-coated paper can be re-used indefinitely.

After thermoplastic resin layer 12 has dried, design layer 14 is formed thereon. As indicated in FIGURE 1, layers 12 and 14 together constitute transfer film 15; as further indicated in FIGURE 2, transfer film 15 is subsequently bonded to polyester film 16. The printing operations by which design layer 14 is formed are preferably carried out in rotary gravure presses. Depending upon the nature of the design, one or more printed impressions may be made, as many as four or more different colors being utilized in some designs. Elements of the design may be discontinuous, but the design layer as a whole should be substantially continuous. To this end, the design may be coated or printed overall with a solid coating, clear or pigmented, containing essentially the same materials as those used in forming the elements of the design.

The printing operation is preferably carried out with an ink made up of a composition consisting, along with the vehicle, of a major proportion of one or more thermoplastic resins such as those of the vinyl family and a minor proportion of one or more thermosetting resins of the aminoplast type; for example one of the urea-aldehyde resins. The quantity of the thermosetting resin or resins should be sufficiently small so that the design layer will remain thermoplastic even after the thermosetting resin or resins have set up. The thermosetting resin or resins used in these inks apparently have the property of reacting under heat with the functional radicals characterizing the resins of the vinyl family, particularly those of thermoplastic resin layer 12. They also have the property of reacting and bonding with polyester films under superatmospheric conditions of heat and pressure.

A typical formulation for the ink is given below:

| Ingredients: | Parts by weight |
| --- | --- |
| Titanium dioxide | 37.50 |
| VAGH vinyl resin | 12.50 |
| Urea-formaldehyde resin F-240 [1] | 2.10 |
| Admex 710 | 2.00 |
| Nitroethane | 13.00 |
| Xylol | 31.00 |
| Diacetone alcohol | 9.00 |
| Butyl alcohol | 2.00 |

[1] A representative resin supplied by Rohm & Haas Company in the form of a 60% dispersion of urea-formaldehyde polymers in xylol and butyl alcohol.

The above ingredients are ground together by any suitable method, as in a pebble mill, colloid mill, etc.

It is to be noted that the bond between the ink and thermoplastic resin layer 12 is not created by the solvent used in the ink. Preferably the solvent is at most only a weak solvent for the material in layer 12. The use of such a solvent in the ink gives a superior quality of gravure printing because the dots of ink left on the thermoplastic resin surface by the printing cylinders flow out and merge with each other. With inks such as are used ordinarily in the decoration of films, this flowing out action does not take place and the ink is left in discrete dots on the film.

In the meanwhile, polyester film 16 should be made ready, as by unrolling it from the supply roll, smoothing out wrinkles, and rendering it taut enough for the later application of transfer film 15. Polyester film 16 may, for example, be of the same or substantially the same chemical composition as the polyester films described in Whinfield et al. Patent 2,465,319, Swallow et al. Patent 2,497,376, and Billica Patent 2,647,885, but is not bi-axially stretched to enhance any pre-existing degree of crystallization and/or orient the molecular structure. From the standpoint of the present invention it is important that the film should not have been stretched in such fashion as to develop substantial molecular orientation, particularly bi-axial orientation.

Preferably polyester film 16 comprises a polymerized alkylene ester of terephthalic acid, with or without modifiers such as copolymers. Examples of the latter are the corresponding esters of phthalic acid, isophthalic acid, 2,5-dimethyl terephthalic acid, hexahydro terephthalic acid, and sundry others. The thickness of the film may vary between a small fraction of a mil, as in a cast film, and almost any desired upper limit, as in an extruded film. Preferred for the purposes of the present invention is an extruded film having a thickness between about .0005 inch and .010 inch. A polymerized tere-iso-phthalate film is particularly satisfactory.

After transfer film 15 has been completed as already described, the design is transferred to polyester film 16 by reversing transfer 9, bringing the exposed surface of design layer 14 into contact with a surface of polyester film 16 and applying heat and pressure: compare FIGURES 1 and 2. The application of the heat and pressure activates and sets up the thermo-setting resin of the ink. This causes design layer 14 to adhere firmly to the polyester film 16. It also effects the desired bond between the design layer and thermoplastic resin layer 12.

Thereafter, paper backing sheet 10 carrying polyethylene layer 11 is stripped off, leaving polyester film 16 with transfer film 15 bonded to it as shown in FIGURE 2. Firmly bonded to the surface of polyester film 16 is design layer 14 and firmly bonded to the latter is thermoplastic resin layer 12. The design layer is visible through polyester film 16. If pigmented, thermoplastic resin layer 12 provides a ground color for the design layer. Whether or not pigmented, it forms a bonding layer that can be used to bond the polyester film to a base material as indicated in FIGURE 3.

In FIGURE 3, the laminate of FIGURE 2 is shown as reversed and applied to a base material 18, here shown as a metal sheet. Design layer 14 overlies thermoplastic resin layer 12; above it, polyester film 16 provides a transparent, wear-resistant and abrasion-resistant surface which is resistant also to stains, moisture and most solvents. The laminate of FIGURE 2 can be made to adhere not only to metals such as steel, brass and aluminum but to thermo-set plastics, to heat-responsive plastics such as polystyrene, vinyl polymers and copolymers, etc., to other rigid and non-rigid plastic sheet materials that do not have the desirable physical characteristics of polyester film 16, to plywood, and to wallboards such as plasterboard, chipboard and the like. The whole constitutes a decorated base material having many uses.

Apparatus for bonding transfer 9 to the polyester film 16 is shown diagrammatically in FIGURE 4. As illustrated in that figure, the apparatus may comprise a supply roll 20 for the polyester film 16 and a supply roll 21 for transfer 9. From the supply roll, polyester film 16 is led over a guide roll 22 into the nip of a pair of pressure rolls 23. Transfer 9 is led into the nip of the pressure rolls 23 from the opposite side, passing over a guide roll 24. Preparatory to the bonding operation, the exposed face of the transfer 9, that is, design layer 14, is heated, as, for example, by electric resistance heaters indicated diagrammatically at 26. Another heater 27 directed at the nip of the rolls 23 supplies heat to polyester film 16 and transfer 9 just as they are brought together.

Preferably, guide rolls 22 and 24, as well as pressure rolls 23, are surfaced with rubber or a synthetic rubber-like material, of which silicone rubber is an example. Surfacing materials of this type are conventional in similar installations. Pressure is maintained on rolls 23 to cause transfer 9 to adhere to polyester film 16. Preferably, the pressure is about 40 to 50 lbs. per lineal inch when rolls having a diameter of 6 inches coated with silicone rubber ⅝ inch thick and of a durometer hardness of 80 are employed. The temperature of the faces of the film and transfer that are brought into contact with each other is preferably about 220° F.

In the preferred form of the apparatus, tension is applied to polyester film 16 and transfer 9 by the pressure rolls 23, which are driven, and by holding back supply rolls 20 and 21. Under the influence of the tension and the temperature, polyester film 16 is stretched slightly, say one or two percent. Transfer 9 is also stretched, preferably to a lesser degree. The stretching of polyester film 16 is only sufficient to flatten out the film and remove waviness from it. This stretch-laminating operation tends to improve the quality of the film itself.

As noted above, the application of heat and pressure bonds thermoplastic resin layer 12 to polyester film 16. It establishes the bond between the thermoplastic resin layer 12 and design layer 14 by setting up the incompletely reacted thermo-setting resin or resins of the ink. In order to insure completion of this reaction, the assembly made up of polyester film 16 and transfer 9 is preferably subjected to additional heat, as by electric resistance heating elements 29, as the assembly travels through the apparatus. For example, the heat may be applied while the assembly travels through the apparatus at a speed of about 30 feet per minute.

Thereafter, the assembly passes through cooling and separating rolls 30 which remove some of the heat from the assembly. Polyester film 16 with transfer film 15, i.e., thermoplastic layer 12 and design layer 14, bonded to it is led upwardly from rolls 30 to takeup reel 32. Paper sheet 10 with polyethylene coating 11 on it is led downwardly from rolls 30 to takeup reel 33. The polyethylene coated paper may be used over again. The decorated polyester film is ready for any of the uses noted above.

Variations in the process, product and apparatus as hereinabove described may be made by those skilled in the art. Thus in leu of using a cast coated paper as a backing medium, it is possible to use other backing media such as machine-finished paper, textile fabrics, and continuous pellicles of various types, usually polymerized synthetic materials. In place of the polyethylene stripping layer, it is possible to use stripping layers of other types, examples other than those previously mentioned being halogenated rubber, cellulose nitrate, cellulose acetate, cellulose butyrate and the like. The synthetic resin or resins used in the ink include the usual members of the group of aminoplasts such as urea-aldehyde resins, thiourea-aldehyde resins, melamine-aldehyde resins and, in general, most if not all of the resins of this class. In general, other aldehydes may be employed in lieu of formaldehyde; e.g., acetaldehyde, propionaldehyde, butyraldehyde, crotonaldehyde, etc. In the case of the thermoplastic resin film and the polyester film, wide variations are possible within the indicated limits.

It is intended that the patent shall cover, by summarization in appended claims, all features of patentable novelty residing in the invention.

What is claimed is:

1. A transfer comprising a backing sheet; a stripping layer on said backing sheet; a strippable thermoplastic layer on said stripping layer; and a substantially continuous design layer overlying said thermoplastic layer, said design layer consisting essentially of a major portion of a thermoplastic resin that is compatible with said thermoplastic layer and a minor portion of an unreacted thermo-setting resin of the aldehyde-amine type that is adapted to react with and bond to said thermoplastic layer under the influence of heat and pressure.

2. A transfer according to claim 1 in which the design layer constitutes the exposed face of the transfer on the side opposite the backing sheet.

3. A transfer according to claim 1 in which a thermoplastic resin layer consisting essentially of an alkylene terephthalate polymer is superimposed on and bonded to the design layer.

4. A transfer comprising a backing sheet; a firmly adhered stripping layer and a lightly adhered strippable layer of thermoplastic material superimposed in that order on the backing sheet, said thermoplastic material consisting essentially of a synthetic resin of the vinyl family which in monomeric form is characterized by at least one functional radical; and, superimposed on said layer of thermoplastic material in such manner as to constitute the exposed face of the transfer on the side opposite the backing sheet, a substantially continuous decorative layer containing both thermoplastic constituents that are compatible with said layer of thermoplastic material and thermosetting constituents of the aldehyde-amine type that are adapted under the influence of superatmospheric temperatures and pressures to react with and bond to the synthetic resin in said layer of thermoplastic material, the thermoplastic constituents of said decorative layer preponderating in amount over the thermosetting constituents.

5. A transfer comprising a backing sheet; a firmly adhered stripping layer and a lightly adhered strippable layer of thermoplastic material superimposed in that order on the backing sheet, said thermoplastic material consisting essentially of a synthetic resin of the vinyl family which in monomeric form is characterized by at least one functional radical; and, superimposed on said layer of thermoplastic material in such manner as to constitute the exposed face of the transfer on the side opposite the backing sheet, a substantially continuous decorative layer containing both thermoplastic constituents that are compatible with said layer of thermoplastic material and thermosetting constituents of the aldehyde-amine type that are adapted under the influence of superatmospheric temperatures and pressures to react with and bond to the synthetic resin in said layer of thermoplastic material, the thermoplastic constituents of said decorative layer being present in an amount several times that of the thermosetting constituents.

6. A transfer comprising a paper backing sheet; a stripping layer on the backing sheet, said stripping layer taking the form of a polyethylene film; a strippable thermoplastic layer on the stripping layer, said strippable thermoplastic layer consisting essentially of vinyl chloride-vinyl acetate copolymers; and, overlying the thermoplastic layer and constituting the exposed face of the transfer on the side opposite the paper backing sheet, a substantially continuous decorative layer incorporating one or more design elements, said decorative layer being composed, together with pigment, of a major proportion of vinyl chloride-vinyl acetate copolymers and a minor proportion of a urea-formaldehyde resin that is adapted under the influence of super-atmospheric temperatures and pressures to react with and bond firmly to the vinyl chloride-vinyl acetate copolymers in said thermoplastic layer.

7. A transfer comprising a paper backing sheet; a stripping layer on the backing sheet, said stripping layer taking the form of a polyethylene film; a strippable thermoplastic layer on the stripping layer, said strippable thermoplastic layer consisting essentially of copolymerized methyl and ethyl esters of acrylic and methacrylic acids; and, overlying the thermoplastic layer and constituting the exposed face of the transfer on the side opposite the paper backing sheet, a substantially continuous decorative layer incorporating one or more design elements, said decorative layer being composed, together with pigment, of a major proportion of vinyl chloride-vinyl acetate copolymers and a minor proportion of a urea-formaldehyde resin that is adapted under the influence of superatmospheric temperatures and pressures to react with and bond firmly to the acrylic and methacrylic copolymers in said thermoplastic layer.

References Cited in the file of this patent

UNITED STATES PATENTS

| | | |
|---|---|---|
| 2,067,435 | Chatfield et al. | Jan. 12, 1937 |
| 2,154,198 | Carr et al. | Apr. 11, 1939 |
| 2,353,717 | Francis et al. | July 18, 1944 |
| 2,475,626 | Leatherman | July 12, 1949 |
| 2,556,078 | Francis | June 5, 1951 |
| 2,558,803 | Wittgren | July 3, 1951 |
| 2,656,327 | Van Wert et al. | Oct. 20, 1953 |
| 2,733,997 | Asnes | Feb. 7, 1956 |
| 2,746,877 | Matthes | May 22, 1956 |
| 2,792,376 | Binkley | May 14, 1957 |
| 2,802,752 | Wood | Aug. 13, 1957 |
| 2,825,707 | Auer | Mar. 4, 1958 |
| 2,920,009 | Humpher | Jan. 5, 1960 |